United States Patent [19]
Johnson

[11] Patent Number: 5,266,287
[45] Date of Patent: Nov. 30, 1993

[54] REGENERABLE FLUE GAS DESULFURIZATION SYSTEM

[75] Inventor: Dennis W. Johnson, Barberton, Ohio

[73] Assignee: The Babcock & Wilcox Company, New Orleans, La.

[21] Appl. No.: 790,900

[22] Filed: Nov. 12, 1991

[51] Int. Cl.$^5$ .............................................. C01B 17/00
[52] U.S. Cl. ........................... 423/243.08; 423/243.09
[58] Field of Search .......... 423/242 A, 243.08, 243.09

[56] References Cited

U.S. PATENT DOCUMENTS

| | | | |
|---|---|---|---|
| 2,080,779 | 5/1937 | Lessing | 423/242 |
| 3,888,968 | 6/1975 | Atsukawa et al. | 423/242 |
| 3,903,243 | 9/1975 | Atsukawa et al. | 423/242 |

Primary Examiner—Gregory A. Heller
Attorney, Agent, or Firm—Robert J. Edwards; Michael L. Hoelter

[57] ABSTRACT

A regenerable flue gas desulfurization system whose end product is preferably a commercial quality gypsum (such as for use in wallboard or the like) or other product easily landfilled. Accordingly, sulfur containing flue gas is passed through an absorber where it is sprayed with a solution so as to initiate certain chemical reactions thereby stripping it of sulfur. Any alkali in this sulfur-containing solution is recovered and returned to the absorber with the remainder of this solution being oxidized in an oxidation/recirculation tank. The slurry from this tank may be recycled to a pre-absorber for chlorine removal if desired, otherwise, a portion of this slurry is sent for the recovery of gypsum.

18 Claims, 1 Drawing Sheet

REGENERABLE FLUE GAS DESULFURIZATION SYSTEM

FIELD OF THE INVENTION

This invention pertains to a method and apparatus for flue gas desulfurization (FGD) and more particularly to a regenerable FGD system which produces gypsum or another disposable and/or commercial item as its end product.

BACKGROUND OF THE INVENTION

As is well known, a by-product of steam or power generating facilities are combustion or flue gases which contain large amounts of sulfur. In an effort to remove this sulfur before it is discharged into the atmosphere, flue gas desulfurization (FGD) systems have been developed. These systems can be roughly grouped into either nonregenerable processes or regenerable processes.

A nonregenerable process is generally calcium based (i.e. lime or limestone). The reagent is added directly into the scrubber vessel and removed from the process as sulfur containing salts ($CaSO_3 \cdot \frac{1}{2}H_2O$, $CaSO_4 \cdot 2H_2O$, etc.). Nonregenerable processes typically produce a waste which requires ponding or treatment for acceptable sulfur disposal such as in a landfill. Alternatively, these processes can also recover sulfur from flue gas and convert it into marketable by-products.

On the other hand, a regenerable process (also known as a dual-alkali, double alkali, or magnesium oxide process) is usually sodium or magnesium based (NaOH, $NaCO_3$, $Mg(OH)_2$, etc.). In this type of process, sulfur is removed from the flue gas by reaction with alkali species of sodium or magnesium. These reactions generally occur in the liquid phase and with much less energy than is usually required for nonregenerable processes due to the higher solubility of sodium and magnesium salts as compared to calcium based reagents. The active alkali in regenerable processes is often $MgSO_3$ or $Na_2SO_3$ and the reactions occurring for sulfur absorption or capture, in simplified form, are:

$$SO_2(g) + H_2O + MgSO_3(aq) \longleftrightarrow Mg(HSO_3)_2(aq) \quad (1)$$

or $$SO_2(g) + H_2O + Na_2SO_3(aq) \longleftrightarrow 2NaHSO_3(aq) \quad (2)$$

In such a regenerable process, the products of reactions (1) and (2) are converted back to sulfite ($SO_3^=$) by the following regeneration reactions:

$$Mg(HSO_3)_2(aq) + Mg(OH)_2 \rightarrow 2MgSO_3(aq) + 2H_2O \quad (3a) \text{ ps}$$
$$Mg(HSO_3)_2(aq) + Ca(OH)_2 \rightarrow MgSO_3 + CaSO_3 \cdot \frac{1}{2}H_2O + \frac{3}{2}H_2O \quad (3b)$$

or $$2NaHSO_3(aq) + CaCO_3(s) \rightarrow Na_2SO_3(aq) + CO_2(g) + CaSO_3 \cdot \frac{1}{2}H_2O + \frac{1}{2}H_2O \quad (4a)$$

$$2NaHSO_3(aq) + Ca(OH)_2 \rightarrow Na_2SO_3(aq) + \frac{3}{2}H_2O + CaSO_3 \cdot \frac{1}{2}H_2O \quad (4b)$$

Thus, the sulfur is captured yet the active alkali ($MgSO_3$ or $Na_2SO_3$) is regenerated in Reactions (3) and (4) for reuse in Reactions 1 and 2 so as to capture more sulfur.

In a magnesium oxide based regenerable system, the regeneration occurs in the absorber or scrubber vessel. In a sodium based "dual alkali" regenerable system, regeneration occurs in a tank or series of tanks outside the absorber vessel. For both such systems, whether sodium and magnesium based, the product of regeneration is a sludge which consists primarily of $CaSO_3 \cdot \frac{1}{2}H_2O$, $CaSO_4 \cdot 2H_2O$, excess reagent, and minor species including magnesium, sodium and/or other calcium salts, fly ash, chloride ion, etc. This sludge also requires ponding or treatment for acceptable disposal such as in a landfill, as does the waste from nonregenerable processes.

As stated above, this invention pertains to a regenerable type of FGD system and it is an object of this invention to combine available FGD technologies with the production of a usable product so as to avoid landfill or ponding costs. A further object of this invention is to utilize either a regenerable dual alkali sodium based system or a magnesium oxide based system in such a manner as to produce gypsum as a usable end by-product. Still another object of this invention is to recover a wallboard quality gypsum or other commercial end product. Yet another object of this invention is to produce a product which is stable and, if such is desired, can be disposed of in a landfill if need be. These and other objects of this invention will become obvious upon further investigation.

SUMMARY OF THE INVENTION

This invention pertains to a method of removing sulfur from flue gas comprising the steps of spraying the flue gas with a liquid slurry in an absorber so as to initiate certain chemical reactions. The stripped flue gas is then discharged from the absorber while the liquid slurry is delivered to an alkali recovery system where alkali is recovered and transported back to the absorber. A by-product of this alkali recovery system is used as a component of an absorbing solution, a portion of which is recycled through a pre-absorber, while another portion of this absorbing solution is sent for the recovery of gypsum.

BRIEF DESCRIPTION OF THE DRAWING

Sole

DETAILED DESCRIPTION OF THE DRAWING

Figure 1:
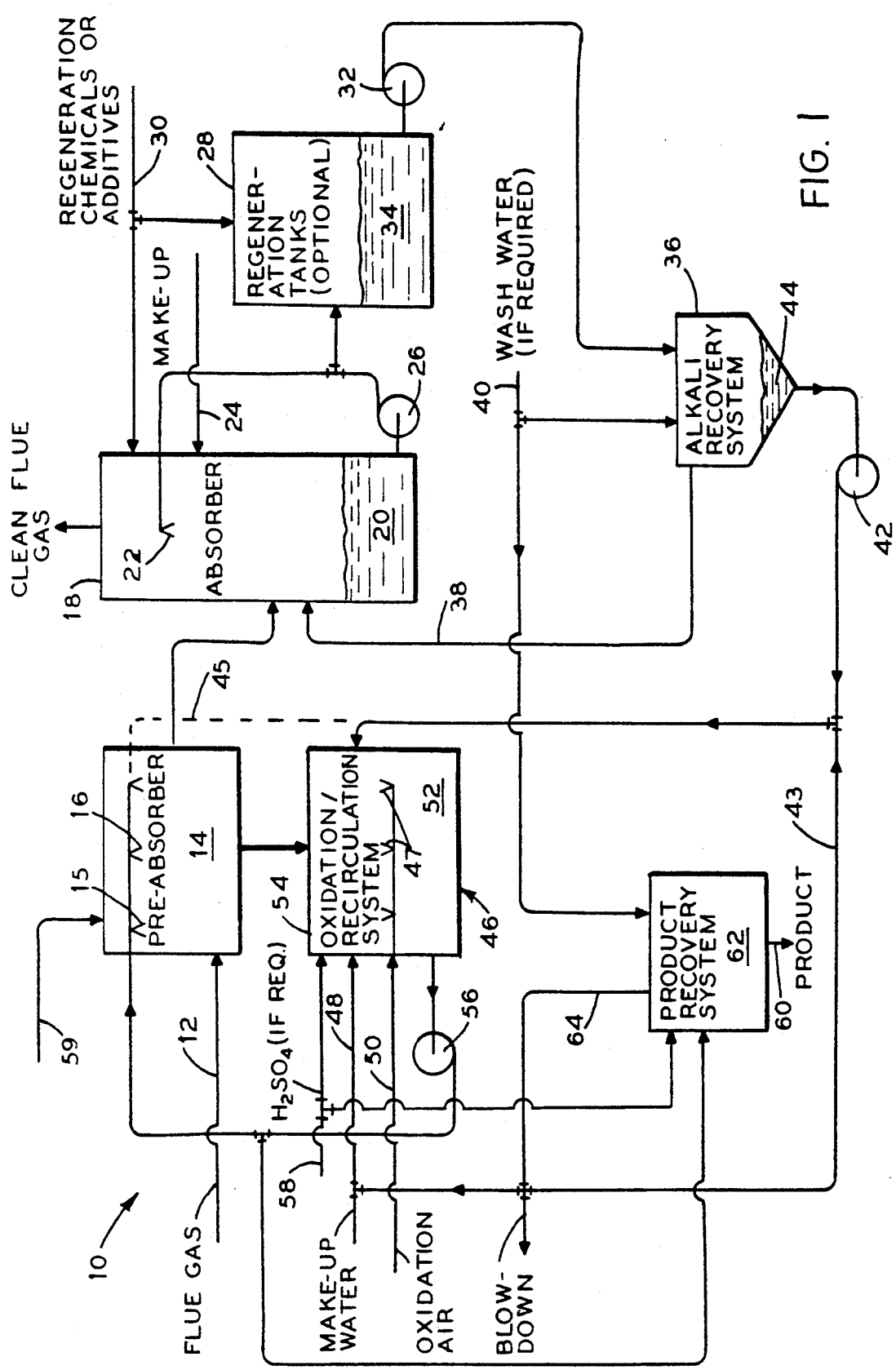
FIG. 1 is a schematic flow diagram illustrating the process covered by this invention.

Referring to the sole drawing, there is shown a schematic flow diagram of regenerable flue gas desulfurization (FGD) process 10. In accordance with the process shown, flue gas 12 enters pre-absorber 14 where spray from spray header 16 strips flue gas 12 of nearly all the chloride it contains and also of a portion of the sulfur and other contaminants in flue gas 12 as will be described later. This chloride reduction reduces the need for downstream ingredients as well as assists in pH control. The early removal of chloride also eliminates or reduces the corrosive effect of high chloride concentrations in downstream machinery and vessels. Pre-absorber 14 also serves the purpose of saturating flue gas 12 prior to entering absorber 18.

In absorber 18, flue gas 12 typically passes through one or more flow distribution devices, such as trays, vanes, and the like, for a more even distribution of the flue gas across the enclosed area of absorber 18. Additionally, an absorbing solution or slurry 20 (the absorber liquid bottoms product) is sprayed upon the rising flue gas 12 from spray head 22 before this cleaned flue gas is discharged from absorber 18. Make-up water 24 is added as required to control solids concentration in this desulfurization process occurring within absorber 18.

The sprayed solution or slurry 20 reacts with the sulfur dioxide ($SO_2$) contained in flue gas 12 in accordance with the following reactions:

$$SO_2(g) \longleftrightarrow SO_2(aq) \tag{5}$$

$$SO_2(aq) + H_2O \longleftrightarrow HSO_3^- + H^+ \tag{6}$$

$$SO_3^= + H^+ \longleftrightarrow HSO_3^- \tag{7}$$

$$HSO_3^- + O_2(aq) \longleftrightarrow SO_4^= + H^+ \tag{8}$$

Sulfur dioxide gas, $SO_2(g)$, converts or absorbs into the aqueous phase, as shown in Reaction (5), by simple diffusion afterwhich it rapidly hydrolyzes as per Reaction (6). The single hydrogen ion produced in Reaction (6) reacts with $SO_3^=$ (in solution with either magnesium or sodium) to form the final product of the $SO_2$ absorption reaction, i.e. $HSO_3^-$ as shown in Reaction (7). A portion of the $HSO_3^-$ is oxidized via Reaction (8) which represents one loss mechanism for the alkaline species of magnesium or sodium which can be controlled by using oxidation inhibiting chemicals such as sulfur or thiosulfate. Generally, and due to the alkaline nature of the materials used in absorber 18, sulfur dioxide removal in the 90% to 99+% range can be achieved.

Pump 26 recirculates slurry 20 within absorber 18 while also delivering a portion to optional regeneration tank or tanks 28 (which is required for sodium based systems since alkali regeneration does not occur ideally within absorber 18 as it does for magnesium oxide based systems). It is within regeneration tank 28 (for sodium based systems) or absorber 18 (for magnesium based systems) that regenerative chemicals or additives 30 (such as $Ca(OH)_2$, $CaCO_3$, or $Mg(OH)_2$) are added. These chemicals or additives 30 are required so as to regenerate sulfite ($SO_3^=$) in the form of the active aqueous alkali $MgSO_3$ or $NaSO_3$ as per Reactions (3) or (4), depending on the system used (i.e. sodium or magnesium oxide based). Such active alkali are then delivered back to absorber 18.

In the event regeneration tank 28 is utilized, the reactions occurring therein are as follows:

$$Ca(OH)_2 + H^+ \longleftrightarrow CaOH^+ + H_2O\}lime \tag{9}$$

$$CaOH^+ + H^+ \longleftrightarrow Ca^{++} + H_2O\}lime \tag{10}$$

$$CaCO_3(s) + H^+ \longleftrightarrow Ca^{++} + HCO_3^-\}limestone \tag{11}$$

$$HCO_3^- + HSO_3^- \longleftrightarrow SO_3^= + CO_2(g) + H_2O\}limestone \tag{12}$$

$$Ca^{++} + SO_3^= + \tfrac{1}{2}H_2O \longleftrightarrow CaSO_3 \cdot \tfrac{1}{2}H_2O(s) \tag{13}$$

$$Ca^{++} + SO_4^= + 2H_2O \longleftrightarrow CaSO_4 \cdot 2H_2O(s) \tag{14}$$

Reactions (9), (10), (13), and (14) occur in lime based dual alkali systems. Reactions (11) through (14) occur in limestone dual alkali systems.

Pump 32 delivers liquor 34 from absorber 18 (via regeneration tank 28 if used) to alkali recovery system 36. It is within alkali recovery system 36 that additional alkali salts in the form of dissolved $Na_2SO_3$ or $MgSO_3$ are recovered and delivered back to absorber 18 (via line 38) so as to maintain a relatively constant and stable composition of slurry 20. The return of these dual alkali substances helps maintain the reactions occurring within absorber 18. If needed, wash water 40 may also be added to alkali recovery system 36 so as to facilitate this task.

Generally, alkali recovery system 36 consists of a combination of settling and filtration equipment, the exact combination, of course, depends upon the physical properties of liquor 34 (and any solids it may contain) as well as the amount of recovery desired.

After the alkali is recycled back to absorber 18, pump 42 delivers the remaining product 44 from alkali recovery system 36 to oxidation/recirculation system 46 and/or directly to pre-absorber 14 via line 45. At this stage, product 44 consists primarily of $CaSO_3 \cdot \tfrac{1}{2}H_2$, $CaSO_4 \cdot 2H_2O$ (gypsum) and excess alkalinity such as $CaCO_3$, $Ca(OH)_2$, $MgSO_3$, and $Na_2SO_3$. In oxidation/recirculation system 46, product 44 is usually mixed with water 48 in a range of about 2% to 35% total suspended solids and also with oxidation air 50 via sparge headers 47 or alternate means to thereby form an absorbing solution 52 in the bottom of recirculation tank 54. This absorbing solution 52 is subsequently circulated to pre-absorber 14 via pump 56. Since system 46 incorporates recirculation tank 54, the pH of circulated absorbing solution 52 (the oxidation tank's liquid bottom product) is kept low so as to promote oxidation. This pH level is controlled to promote oxidation first by $SO_2$ absorption and then by the addition of sulfuric acid 58 if such is required. The overall reaction occurring within oxidation/recirculation system 46 being:

$$CaSO_3 \cdot \tfrac{1}{2}H_2 + \tfrac{1}{2}O_2 + 1\tfrac{1}{2}H_2O \rightarrow CaSO_4 \cdot 2H_2O \text{ (Oxidation)} \tag{15}$$

The detailed oxidation reactions occurring in oxidation/recirculation system 46 include:

$$CaSO_3 \cdot \tfrac{1}{2}H_2O + H^+ \rightarrow Ca^{++} + HSO_3^- + \tfrac{1}{2}H_2O \tag{16}$$

$$O_2(g) \longleftrightarrow O_2(aq) \tag{17}$$

$$\tfrac{1}{2}O_2(aq) + HSO_3^- \rightarrow SO_4^= + H^+ \tag{18}$$

$$Ca^{++} + SO_4^= + 2H_2O \rightarrow CaSO_4 \cdot 2H_2O \tag{19}$$

$$H_2SO_4 \longleftrightarrow 2H^+ + SO_4^= \tag{20}$$

For the case where product 44 is sprayed directly into pre-absorber 14 via line 45, product 44 may first be diluted to a range of about 2 to 25% total suspended solids by make-up or dilution water stream 43. Diluted product 44 would then be sprayed through separate header 15 or combined with absorbing solution 52 and sprayed through header 16.

Any sulfur dioxide in flue gas 12 passing through pre-absorber 14 reacts with any excess alkalinity in absorbing solution 52 (and/or diluted product 44) in accordance with the same absorption and neutralization reactions that occur in absorber 18 and cited above as Reactions (1)-(2) and (5)-(8). Further, since alkaline species such as $CaCO_3$, $CaO(H)_2$, $Mg(OH)_2$, $NaCO_3$, etc. can exist in product 44, additional absorption and neutralizations involving these salts occur. Sulfur dioxide removal in pre-absorber 14 should be in the range of approximately 0-50%. Furthermore, chemical additives 59 may be added to absorbing solution 52 in order to enhance sulfur removal in pre-absorber 14. Such chemical additives 59 include organic acid (i.e. formic, adipic, dibasic, etc.). Finally, crystal habit modifiers, which promote crystal growth, or scale inhibitors can be added as desired.

Pre-absorber 14 has three additional advantages in this embodiment of FGD process 10. First, it will remove in excess of 90% of the chloride entering the flue gas (as discussed earlier). This is important so that the material requirements for downstream absorber 18 can be reduced. In fact, absorber 18 can now be constructed of low grade alloys (such as 316SS) thereby eliminating any need for linings. Second, such early chloride removal in pre-absorber 14 helps pH control. Thus, any effects due to high chloride concentrations in absorber 18 or any reaction of chloride with the dual alkali sources (magnesium or sodium) is significantly reduced. Third, other contaminants such as particulate matter and heavy metals are removed. Additionally, and as stated earlier, pre-absorber 14 saturates flue gas 12 prior to entering absorber 18.

Absorbing solution 52 contains gypsum 60 which can be extracted and is recovered in product recovery system 62 as a wallboard quality or other commercial quality product. Alternatively, absorbing solution 52 can be prepared into a disposable product in recovery system 62 by filtration, settling, fixating and/or washing with wash water 40. If desired, the effluent by-product 64 of product recovery system 62, or a portion thereof, can be returned to recirculation tank 54 such as by comprising a part of make-up water 48. In the alternative, a portion of effluent by-product 64 can be used to dilute product 44. Finally, sulfuric acid 58 can be added to product recovery system 62, if required, to produce the desired product composition.

To recap some of the advantages of FGD process 10, this invention provides for sulfur dioxide removal greater than 99%. It also enables a commercial product to be created or a product that is suitable for landfill if such is desired. Additionally, because of the removal of chloride prior to absorber 18, this tower can be constructed of low grade alloys thereby eliminating linings in addition to the reduction in the loss of expensive reagents such as magnesium hydroxide ($Mg(OH)_2$), caustic soda (NaOH) or soda ash ($Na_2CO_3$). Furthermore, acid requirements are lower than with conventional ex situ oxidation systems, and this process will work for sodium-limestone or sodium-lime dual alkali systems or magnesium promoted lime or limestone systems. Other advantages provided by this invention pertain to it operating as a closed loop and, for sodium systems, it operates as a solution scrubbing method while also reducing the need to wash the mist eliminators.

Because of the removal of $SO_2$ in pre-absorber 14, the inlet $SO_2$ loading to absorber 18 is reduced. This has several favorable effects, first, the energy expended to produce the mass transfer surface in absorber 18 to achieve an overall design system sulfur removal is reduced proportionally to the reduced inlet $SO_2$ loading from pre-absorber 14. Second, the pH in absorber 18 can be reduced in order to promote the regeneration reactions that occur in tank 28 or in absorber 18 for magnesium promoted lime systems. Finally, the utilization of the regenerative chemicals ($CaCO_3$, $Ca(OH)_2$, $Mg(OH)_2$, etc.) is increased due to reactions that occur in pre-absorber 14 that do not occur in other dual alkali systems.

What is claimed is:
1. A sodium or magnesium based regenerable flue gas desulfurization method comprising the steps of:
   (a) introducing a sulfur oxide containing flue gas into an absorber containing a sodium or magnesium based slurry therein;
   (b) engaging or contacting said flue gas in said absorber with said slurry;
   (c) removing said sulfur oxides, including sulfur dioxide, from said flue gas in said absorber by initiating gas phase diffusion of said sulfur oxides into said slurry thereby discharging cleaned flue gas from said absorber;
   (d) diverting a portion of said slurry from said absorber to an alkali recovery system where sodium or magnesium based alkali, which has been regenerated by chemical reaction with calcium based alkali, is recovered and returned back to said absorber and combined with said slurry;
   (e) using a by-product of said alkali recovery system as a component of an absorbing solution and delivering a first portion of said absorbing solution to a pre-absorber for pre-engagement or contact with said flue gas; and,
   (f) delivering a second portion of said absorbing solution to a product recovery system where a solid gypsum product, including wall-board or other commercial quality gypsum, is recovered by physical separation from said solution.

2. The method as set forth in claim 1 further comprising the step of recirculating a portion of said absorbing solution from a recirculation tank to said pre-absorber and returning said spent product back to said recirculation tank.

3. The method as set forth in claim 2 further comprising the step of oxidizing the said by-product of said alkali recovery system in said recirculation tank to form said stable, disposable absorbing solution.

4. The method as set forth in claim 2 further comprising the step of introducing make-up water to said recirculation tank for the formation of said absorbing solution.

5. The method as set forth in claim 2 further comprising the step of introducing sulfuric acid, formic acid, dibasic acid, adipic acid or other organic acids to said absorbing solution to promote oxidation, to promote sulfur removal, to control scale formation and/or to promote crystal growth in said pre-absorber.

6. The method as set forth in claim 1 further comprising the step of diluting said by-product of said alkali recovery system with a portion of the by-product of said product recovery system.

7. The method as set forth in claim 1 further comprising the step of adding calcium hydroxide, calcium carbonate, or magnesium hydroxide to said slurry to produce alkaline species so as to maintain the chemical reactions occurring within said absorber and to aid in the precipitation and subsequent removal of sulfur containing salts in said alkali recovery system.

8. The method as set forth in claim 7 further comprising the step of providing a regeneration tank or tanks intermediate said absorber and said alkali recovery system for the regeneration of magnesium or sodium sulfite which is to be returned back to said absorber and combined with said slurry.

9. The method as set forth in claim 8 further comprising the step of introducing wash or make-up to said pre-absorber, absorber, regeneration tank, alkali recovery system, and/or product recovery system as needed.

10. A sodium or magnesium based regenerable flue gas desulfurization method comprising the steps of:
   (a) introducing sulfur containing flue gas first to a pre-absorber and then to an absorber for the removal therein of sulfur oxides, including sulfur dioxide, across a gas-liquid interface;
   (b) contacting said flue gas in said pre-absorber with an absorbing solution and contacting said flue gas in said absorber with a sodium or magnesium based slurry;
   (c) recirculating all or part of said spent absorbing solution form said pre-absorber through a recirculation tank where a portion of said absorbing solution is regenerated and delivered back to said pre-absorber;
   (d) delivering all or part of said spent slurry from said absorber to an alkali recovery system where sodium or magnesium based alkali, which has been regenerated by chemical reaction with calcium based alkali, is recovered and transported back to said absorber and combined with said slurry, all or part of the remaining by-product of said alkali recovery system being delivered directly to said recirculation tank or being delivered indirectly to said recirculation tank through said pre-absorber; and,
   (e) recovering a disposable solid gypsum product from said absorbing solution by physical separation from solution.

11. The method as set forth in claim 10 further comprising the step of oxidizing the said remaining by-product of said alkali recovery system in said recirculation tank.

12. The method as set forth in claim 10 further comprising the step of introducing make-up water to said recirculation tank for the formation of said absorbing solution.

13. The method as set forth in claim 10 further comprising the step of introducing sulfuric acid, formic acid, dibasic acid, adipic acid or other organic acids to said absorbing solution to promote oxidation to promote sulfur removal, to control scale formation, and/or to promote crystal growth in said pre-absorber.

14. The method as set forth in claim 10 further comprising the step of diverting a portion of said absorbing solution to a product recovery system where a disposable product is recovered.

15. The method as set forth in claim 10 further comprising the step of diluting said by-product of said alkali recovery system prior to delivery to said recirculation tank.

16. The method as set forth in claim 10 further comprising the step of adding calcium hydroxide, calcium carbonate, or magnesium hydroxide to said slurry to produce alkaline species so as to maintain the chemical reactions occurring within said absorber and to aid in the precipitation and removal of sulfur containing salts in said alkali recovery system.

17. The method as set forth in claim 16 further comprising the step of providing a regeneration tank or tanks intermediate said absorber and said alkali recovery system for the regeneration of magnesium or sodium sulfite which is delivered back to said absorber and combined with said slurry.

18. The method as set forth in claim 17 further comprising the step of introducing wash or make-up water to said pre-absorber, absorber, regeneration tank, alkali recovery system, and/or product recovery system as needed.

* * * * *